May 17, 1960     E. F. MACKS     2,937,294

DYNAMOELECTRIC DEVICE WITH FLUID SUPPORTED ROTOR

Filed April 12, 1956

*INVENTOR.*
ELMER FRED MACKS
BY *Pyle and Fisher*
ATTORNEYS

United States Patent Office 2,937,294
Patented May 17, 1960

2,937,294

DYNAMOELECTRIC DEVICE WITH FLUID SUPPORTED ROTOR

Elmer Fred Macks, Vermilion, Ohio, assignor, by direct and mesne assignments, to Air-Glide, Inc., Cleveland, Ohio, a corporation Application April 12, 1956, Serial No. 577,828

16 Claims. (Cl. 310—90)

This invention pertains to dynamoelectric devices with fluid supported rotors, and more particularly to a dynamoelectric device wherein a static fluid pressure is supplied to support a rotor for rotation of the rotor in a complemental stator element.

In my copending application for patent Serial No. 558,676, filed January 12, 1956, under the title "Fluid Supported Rotor," now abandoned, in favor of continuation-in-part application Serial No. 714,454, filed January 28, 1958, there has been disclosed a dynamoelectric machine of the type wherein a fluid dynamic film is formed to support the rotor. In that application the broad principles of a dynamoelectric machine having a fluid supported rotor have been disclosed, but, generally speaking, these broad principles are directed toward a device which is primarily of limited size. It has been discovered that through certain modifications and improvements, rotors of substantial size can be supported on an externally pressurized fluid film in a machine of this type. Furthermore, the starting and stopping conditions as affecting the load supporting surfaces are not as critical.

Accordingly, one of the principal objects of this invention is to provide a dynamoelectric device wherein a rotor is supported on a fluid film prior to rotation.

A further object of this invention is to provide a device wherein bearings, bell housings, and other parts as well as machining operations, alignment, and other problems associated with prior known dynamoelectric devices are eliminated.

Another object of this invention is to provide a device in which the rotor and the stator have complemental surfaces in a close running fit and in which apertures are formed in one of the surfaces, the apertures being in communication with a source of fluid under pressure to provide a static fluid film between the complemental surfaces.

Still another object of this invention is to provide a device wherein relatively rotating elements having complemental surfaces are provided and wherein one of the surfaces has a plurality of recesses formed therein, the recesses each having an aperture in communication with a source of fluid whereby the recesses may serve to increase the static load carrying capacities of a static fluid film, and additionally, in the preferred embodiment may serve to form stepped convergences to improve the characteristics of the load carrying fluid dynamic film formed upon relative rotation of the elements.

An additional object of this invention is to provide a device constructed in accordance with the device of the foregoing objective having in combination therewith a compressor or pump, an accumulator, and control and check valves connected to the apertures whereby fluid under pressure may be conducted to the recesses through the control valve or upon closure of the control valve fluid may be conducted through the check valve to the recesses.

Yet another object of this invention is to provide a device wherein a gas may be employed under either or both static and fluid dynamic pressure to support a rotor in a dynamoelectric machine.

Still another principal object of this invention is to provide a quiet, substantially vibrationless, highly efficient, low cost machine which is not affected by extremes of temperature and other adverse surrounding conditions.

A further object of this invention is to provide a device wherein two combination fluid dynamic and static films are provided, one to form a thrust bearing film and the other to form a journal bearing film.

Still another object of this invention is to provide a device wherein load supporting thrust bearing and journal bearing films are provided and wherein one of the films may be a liquid film and the other film a gas film.

An additional object of this invention is to provide a permeable or foraminous wall having a plurality of apertures therein through which fluid under pressure may be passed to provide a static fluid film to support a rotor of a dynamoelectric machine.

Other objects and a fuller understanding of the invention may be had by referring to the following description and claims, taken in conjunction with the accompanying drawing, in which:

Figure 1:
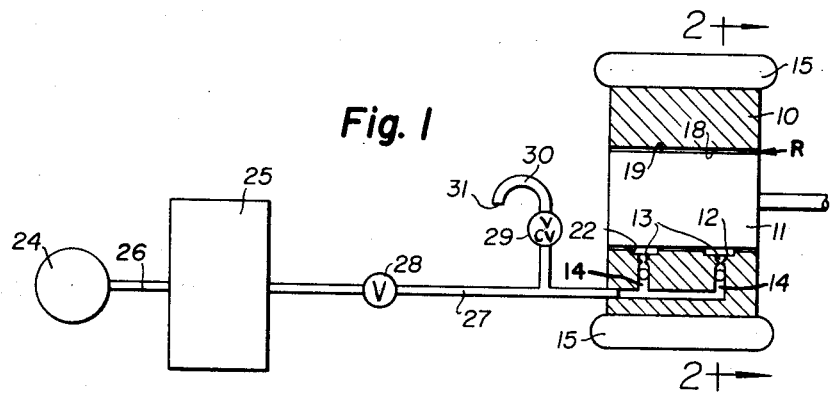
Figure 1 is a diagrammatic view showing a sectional view of a dynamoelectric device having longitudinally spaced recesses and a mechanism to supply fluid to the recesses.

Referring to the drawing, a stator is shown schematically at 10, with a rotor indicated at 11. In each case the stator has a field or winding indicated at 15, and the rotor 11 is the armature. The principles disclosed and discussed are, of course, applicable to a dynamoelectric machine of the type wherein the armature is the stator and the field is carried by the rotor.

The stator 10 and the rotor 11 have complemental surfaces 18, 19 which are in a close running fit. The surfaces 18, 19 define a load carrying fluid dynamic film producing region "R" therebetween. This region "R" has a radial dimension of from 0.000040 to 0.003 inch per inch of diameter. When gas is the ambient fluid this dimension is less than when oil is the fluid; the exact dimensions also depend upon the operating conditions. The surfaces 18, 19 are preferably cylindrically contoured and have a taper which is not in excess of about 0.0003 inch per inch of length per inch of diameter. The cylindrical surfaces may be discontinuous.

Figure 2:
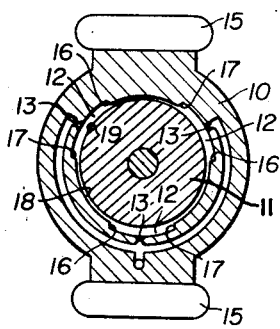
Figure 2 is a schematic sectional view taken in the plane indicated by line 2—2 of Figure 1 of a dynamoelectric device made in accordance with the present invention wherein a plurality of angularly spaced recesses are employed to aid in the formation of a fluid film.

In Figure 2 a plurality of recesses 12 are formed in the stator surface 18. These recesses are shown greatly exaggerated in Figure 2 for clarity. When both static and fluid dynamic films are employed in a single device the recesses have a depth of from 0.000040 to 0.003 inch per inch of diameter depending on the operating conditions. Fluid passages 14 communicate with the apertures 13. Prior to rotation fluid under pressure may be introduced through the passages 14 to the recesses 12. The recesses 12 then serve as pockets in which static pressure may be accumulated to form a rotor supporting static fluid film.

In this construction the well known principles of either capillary or orifice compensation may be employed. The aperture 13 may be a restricted orifice for example to cause a pressure drop which is proportional to the rate of fluid flow.

Upon relative rotation of the rotor 11 and stator 10, a fluid dynamic film will be built up by the coaction of complemental surfaces 18, 19. As the elements 10, 11 are rotating the recesses serve to increase the pressure of the fluid dynamic film by serving as stepped convergence devices. Thus, as the rotor 11 is rotating in a clockwise direction, as seen in Figure 2, fluid moves clockwise through the recesses and over shoulder 16 into an area of less radial dimension. As this occurs, the fluid pressure of the fluid dynamic film is materially increased. Fluid for this film is supplied through the apertures 13. The apertures 13 are, in the device of Figure 2, centrally located to provide a reversible mechanism. Thus, if the rotor 11 rotates in a counterclockwise direction, the shoulders indicated at 17 serve as steps to perform a stepped convergence function.

In the device of Figure 1, a second recess 22 is shown in longitudinally spaced relationship with one of the recesses 12. Three or more such recesses 22 may also be employed. Thus, sets of recesses which comprise a plurality of longitudinally spaced recesses are used to provide axially spaced regions of increased fluid pressure. These regions of increased fluid pressure serve to aid in resisting dynamic and misalignment forces. In its preferred form for resisting misalignment forces, a plurality of circumferentially spaced sets of recesses are formed in the surface 18.

A compressor or pump is shown diagrammatically at 24, and an accumulator in the same fashion at 25. A fluid conduit 26 connects the compressor to the accumulator. The accumulator in turn is connected to the passages 14 through conduit 27. A control valve 28 is preferably located in the conduit 27. A check valve is connected to the conduit 27 through conduit 30. The conduit 30 preferably has a downwardly disposed end 31 to minimize the dirt drawn into the conduit 30, and the end 31 may have a filter thereon.

When the device of Figure 1 is placed in operation, the compressor is operated to accumulate a supply of fluid in the accumulator 25. The control valve 28 is then opened and fluid is passed through the conduit 27, the passages 14 and into the recesses 12, 22 to provide a static film to support the rotor 11. When fluid under pressure is introduced into the recesses through the conduit 27, the check valve 29 closes. After rotation of the rotor 11 has been commenced a fluid dynamic film is developed in the region between surfaces 18, 19. When air is used as the lubricating fluid in the preferred embodiment, this film may be referred to as a "pneumodynamic film." After the rotation is fully present, the control valve 28 may be closed and the check valve 29 will open. The operation of the check valve 29 may be controlled by gravity, a light spring, or other well known mechanism Also, the operation of the valves may be automatically controlled by an interlock system, not shown.

With the check valve 29 open, the atmospheric pressure will force fluid through the conduit 30 and into the passages 14 and thence through the apertures 13 into the recesses 12, 22. This is true since an area of reduced pressure will develop in the region of the apertures 13. When the device is stopped, static pressure may again be supplied to the recesses 12, 22.

Figure 3:
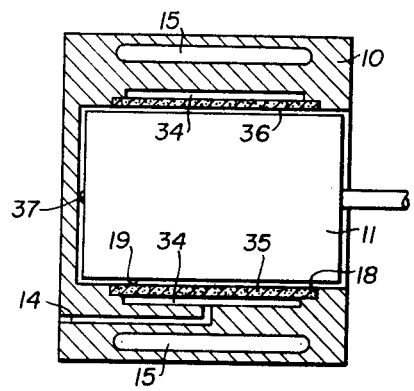
Figure 3 is a sectional view of a dynamoelectric device wherein the foraminous wall is employed to define in part the complemental surface of one of the elements; and, Figure 4 is a sectional view of a fluid supported rotor device wherein both thrust bearing and journal bearing fluid films are provided.

In the embodiment of Figure 3, a cavity 34 is formed in the stator 10. A foraminous wall 35 is supported adjacent the cavity to form part of the stator. The wall has a smooth outer surface 36 which forms at least a part of the stator complemental surface 18. The foraminous wall 35 also has an inside surface which is in communication with the cavity 34. In operation, fluid under pressure in introduced into the cavity 34. The fluid passes through the foraminous wall 35. As the fluid passes through the restrictive apertures of the foraminous wall 35, a pressure drop is experienced. This pressure drop is proportional to the rate of fluid flow. If, during operation, the rotor 11 moves close to the wall in one area, the dimension of the fluid film region between surfaces 18, 19 is reduced in that area. Thus, the rate of axial escape of fluid along the rotor is, of course, materially reduced in that area. The decrease in the rate of fluid flow gives rise to an immediate decrease in pressure drop through the foraminous wall. Thus, the pressure of the film in an area where the fluid region is of reduced radial dimension becomes high. Therefore, the device provides a static fluid film which is inherently self-balancing to support a load in any direction.

The foraminous wall 35 may be an annular wall to provide an entirely static pressure device. In many applications the foraminous wall may be composed of a group of segmental sections in angularly spaced relationship. Thus, the fluid dynamic film formed in the region between surfaces 18, 19 may have segments wherein the static pressure is provided through the foraminous walls 35 and sections intermediate these segments where a load supporting fluid dynamic film is formed.

In Figure 3 a thrust bearing is shown schematically at 37. In operation, the rotor 11 is held in appropriate axial position by the action of the field 15. However, when the field is deactivated as the machine is turned off, the rotor 11 may tend to shift axially. Hence, the thrust bearing 37 is provided. Additionally, axial forces may be applied against the rotor which may tend to cause the rotor to shift. For example, if the axis of the device is something other than horizontal, the rotor may tend to shift axially from its own weight. As will be apparent, thrust bearings may be provided at both ends of the rotor if required for a given application.

Figure 4:
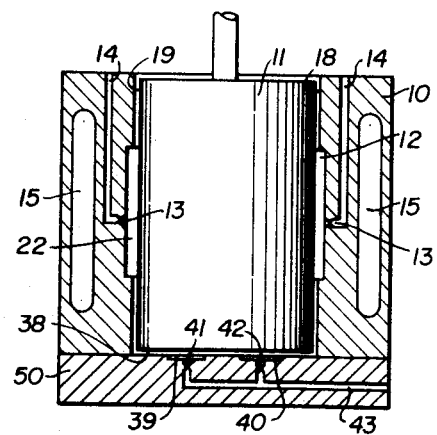

In the embodiment of Figure 4, the rotor 11 is disposed about a vertical axis. In this embodiment, end thrust is absorbed by a fluid dynamic film region 38. A plurality of recesses such as 39, 40 may be formed in stator end plate 50. The recesses 39, 40 have apertures 41, 42, respectively, which may be orifice or capillary compensated. Passages 43 are formed in the end plate 50 to communicate with the apertures 41, 42. The recesses 39, 40, like the recesses 12, 22, may serve to aid in the production of both static and fluid dynamic films. Recesses may be provided in either the surface 18 or the rotor surface 19, or both. The number and spacing of recesses depends wholly on the conditions encountered, such as the speed of rotation, the weight of the rotating element, and the viscosity of the lubricating fluid.

In the construction of Figure 4 a further novel discovery has been made. The weight of the rotor 11 is supported almost entirely on the film produced in the thrust film fluid region 38. Thus, the pressure in this region may be relatively high. A liquid can be used in this region since it is generally simpler to supply liquids at high pressure than it is to obtain high gas pressures. Even though a liquid is used in the thrust fluid region 38 a gas may be employed as the lubricant in the journal fluid film region defined by surfaces 18, 19. Thus, the load carrying capacity of a liquid may be utilized for thrust film and the low friction, high efficiency film of a gas may be employed for the journal film. Conversely, of course, if the device of Figure 4 is in a position wherein the axis of rotation is substantially horizontal, a liquid may be used for the journal film and a gas for the thrust film. In the device of Figure 4 it is also possible to supply static pressure to one of the fluid films and employ a load carrying fluid dynamic pressure alone in the other of the films.

There has thus been described a device wherein fluid under a static pressure may be provided to wholly support a rotor in a dynamoelectric machine without bearings until rotation is commenced, and wherein a fluid dynamic film is formed after rotation is commenced to thereafter totally support the rotor.

There has further been described a device wherein recesses are formed to serve as pockets which increase the load carrying capacity of a static film and also to serve as stepped convergence recesses to improve the load carrying characteristics of a hydrodynamic film formed upon relative rotation of the elements.

There has further been described a mechanism for providing fluid under pressure to provide a static fluid film in a dynamoelectric machine for initial operation and wherein said mechanism will also provide fluid for a fluid dynamic film formed upon relative rotation of the elements. Further, the device which has been described may employ either a gas or a liquid or both in any combination to provide journal and thrust load carrying fluid supporting films.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dynamoelectric device comprising first and second relatively rotatable elements, the first element including means to induce a magnetic field, said elements being rotor and stator elements, one of the elements having a cavity therein, a foraminous wall carried by and forming a part of said one element, the wall having an inner surface and a smooth outer surface, the inner surface being in communication with the cavity, the other of said elements having a smooth outer surface, said outer surfaces being closely spaced complemental surfaces defining a fluid film producing region therebetween, the region being located in part within the magnetic field and being longitudinally disposed about the axis of the rotor, said rotor being totally supported radially by the film generated in said region when the device is in operation, and fluid pressure means communicating with said cavity to introduce fluid under pressure into said cavity, whereby to provide a device in which fluid under pressure may be introduced into the cavity and caused to pass through the wall to form a load carrying fluid film region defined by said outer surfaces.

2. A dynamoelectric device comprising relatively movable rotor and stator elements, one of said elements including a means to induce a magnetic field, the stator having a cavity therein, a foraminous wall carried by and forming a part of the stator, the wall having an inner and a smooth outer surface, the inner surface being in communication with the cavity, said rotor having a smooth outer surface, said outer surfaces being closely spaced complemental surfaces defining a fluid film producing region therebetween, said region being located in part within the magnetic field and longitudinally disposed about the axis of the rotor, said rotor being totally supported radially by the film generated in said region when the device is in operation, and fluid pressure means communicating with said cavity to introduce fluid under pressure into said cavity, whereby to provide a device in which fluid under pressure may be introduced into the cavity and caused to pass through the wall to form a load carrying fluid film region defined by said outer surfaces.

3. A dynamoelectric device comprising first and second relatively rotatable elements, the first element including means to induce a magnetic field, said elements being rotor and stator elements having closely spaced complemental surfaces defining a fluid film producing region therebetween, the region being located in part within the magnetic field and being longitudinally disposed about the axis of the rotor, said rotor being totally supported radially by the film generated in said region when the device is in operation, one of the elements having a cavity formed therein, a plurality of foraminous wall segments each having an inner and a smooth outer surface, said wall segments being carried by said one element with the inner surfaces in communication with said cavity, said wall outer surfaces forming spaced portions of the complemental surface of said one element.

4. A dynamoelectric device comprising relatively rotatable rotor and stator elements, said elements having closely spaced complemental surfaces defining one load supporting air film region therebetween one of said elements being a magnetic field inducer, said region being located at least in part within the magnetic field and being longitudinally disposed about the axis of the rotor, one of said surfaces having at least one set of recesses formed therein, the recesses of said set being in longitudinally spaced relationship, each of said recesses having an aperture therein, and air supply means communicating with each of said apertures, said rotor being totally supported radially by the film generated in said region when the device is in operation, whereby air under pressure may be introduced into said recesses to provide a static supporting film and whereby said recesses will also serve to form convergences to improve the load carrying characteristics of a pneumodynamic film formed upon relative rotation of the elements.

5. A dynamoelectric device comprising first and second relatively rotatable elements, the first element including means to induce a magnetic field, one of said elements being a rotor and the other of the elements being a stator, said elements having closely spaced complemental surfaces defining a first fluid film producing region, said first fluid film producing region being located concentrically about the axis of relative rotation and disposed in part within the magnetic field, said elements having a second set of closely spaced complemental surfaces, said second set of surfaces lying in planes which are substantially normal to the axis of rotation, said first set of surfaces being journal bearing surfaces and said second set of surfaces being thrust bearings surfaces, one of the surfaces in each set of surfaces having a recess therein, each of said recesses having an aperture therein, liquid supply means communicating with one of the apertures to provide a liquid lubricant under pressure, and gas fluid supply means communicating with the other of said apertures to provide a gas under pressure, and said rotor being totally supported on said films when the device is in operation, whereby to provide a device wherein liquid may be introduced into one of the film producing regions and gas into the other to support the loads imposed on each of said films.

6. A dynamoelectric device comprising relatively rotatable rotor and stator elements, said elements having closely spaced complemental surfaces defining one load supporting gas film region therebetween one of said elements being a magnetic field inducer, said region being located at least in part within the magnetic field and being longitudinally disposed about the axis of the rotor, said region having a radial dimension of from 0.000040 inch to 0.003 inch per inch of diameter, one of said surfaces having a plurality of apertures therein, and means connected to said apertures to pass gas under pressure through said apertures into said gas film region, said rotor being totally supported radially by the film generated in said region when the device is in operation.

7. A dynamoelectric device comprising relatively rotatable rotor and stator elements, said elements having closely spaced substantially cylindrically contoured complemental surfaces defining one load supporting gas film region therebetween, one of said elements being a magnetic field inducer, said region being located at least in part within the magnetic field and being longitudinally disposed about the axis of the rotor, said surfaces being formed with not more than about 0.0003 inch taper per inch of diameter per inch of length, one of said surfaces having a plurality of apertures therein, and means connected to said apertures to pass gas under pressure through said apertures into said gas film region, said rotor being totally supported radially by the film generated in said region when the device is in operation.

8. A dynamoelectric device comprising relatively rotatable rotor and stator elements, said elements having cylindrically contoured surfaces defining a load supporting fluid film region therebetween, one of said surfaces having a plurality of apertures therein, means connected to said aperture to pass fluid under pressure through said apertures into said fluid film region, said rotor being totally supported radially by a film of fluid in said region when said device is in operation, said rotor element surface being symmetrically disposed about a geometric axis, and said rotor element having an axis of rotation distinct from said geometric axis.

9. A dynamoelectric device comprising relatively rotatable rotor and stator elements, said elements having closely spaced complemental surfaces defining one load supporting fluid film region therebetween, one of said elements being a magnetic field inducer, said region being located at least in part within the magnetic field and being longitudinally disposed about the axis of the rotor, said surfaces being cylindrical and coaxial with the axis of the rotor, one of said surfaces having a recess formed therein, said recess having pressure compensating aperture means formed therein, and fluid supply means communicating with said aperture means, said rotor being totally supported radially by the film generated in said region when the device is in operation, whereby fluid under pressure may be introduced into said recess to provide a pressure compensated static supporting film and whereby said recess will also serve to form a convergence in order to develop load carrying characteristics in a fluid dynamic film formed upon relative rotation of the elements.

10. A dynamoelectric device comprising relatively rotatable rotor and stator elements, said elements having closely spaced complemental surfaces defining one load supporting gas film region therebetween, one of said elements being a magnetic field inducer, said region being located at least in part within the magnetic field and being longitudinally disposed about the axis of the rotor, said surfaces being cylindrical and coaxial with the axis of the rotor, one of the surfaces having a plurality of recesses formed therein at spaced locations, each of said recesses having an aperture therein, and gas supply means communicating with each of said apertures, said rotor being totally supported radially by the film generated in said region when the device is in operation, whereby gas under pressure may be introduced into said recesses to provide a static supporting film and whereby said recesses will also serve to form convergences to improve the load carrying characteristics of a fluid dynamic gas film formed upon relative rotation of the elements.

11. A dynamoelectric device comprising relatively rotatable rotor and stator elements, said elements having closely spaced complemental surfaces defining one load supporting gas film region therebetween, one of said elements being a magnetic field inducer, said region being located at least in part within the magnetic field and being longitudinally disposed about the axis of the rotor, said surfaces being cylindrical and coaxial with the axis of the rotor, one of said surfaces having a recess formed therein, said recess having a radial dimension from 0.000040 inch to 0.003 inch per inch of diameter of said one surface, said recess having an aperture therein, and gas supply means communicating with said aperture, whereby gas under pressure may be introduced into said recess to provide a static supporting film and whereby said recess will also serve to form a convergence to increase the load carrying capacity of a fluid dynamic gas film formed upon relative rotation of the elements.

12. A dynamoelectric device comprising relatively rotatable rotor and stator elements, said elements having closely spaced complemental surfaces defining one load supporting gas film region therebetween, one of said elements being a magnetic field inducer, said region being located at least in part within the magnetic field and being longitudinally disposed about the axis of the rotor, said surfaces being cylindrical and coaxial with the axis of the rotor, one of said surfaces having a plurality of circumferentially spaced sets of recesses formed therein, each of said sets of recesses being a plurality of longitudinally spaced recesses, each of said recesses having an aperture therein, and gas supply means communicating with each of said apertures, said rotor being totally supported by the film generated in said region when the device is in operation, whereby gas under pressure may be introduced into said recesses to provide a static supporting gas film and whereby said recesses will also serve to form convergences to improve the load carrying characteristics of a fluid dynamic gas film formed upon relative rotation of the elements.

13. A dynamoelectric device comprising relatively rotatable rotor and stator elements, said elements having closely spaced complemental surfaces defining one load supporting gas film region therebetween, one of said elements being a magnetic field inducer, said region being located at least in part within the magnetic field and being longitudinally disposed about the axis of the rotor, said surfaces being cylindrical and coaxial with the axis of the rotor, each of said surfaces having a recess formed therein, one of said recesses having an aperture therein, and gas supply means communicating with said aperture, said rotor being totally supported radially by the film generated in said region when the device is in operation, whereby gas under pressure may be introduced into said one recess to provide a static supporting gas film and whereby said recesses will also serve to form convergences to increase the load carrying capacity of a fluid dynamic gas film formed upon relative rotation of the elements.

14. The device of claim 8 wherein the fluid is gas.
15. The device of claim 9, wherein the fluid is gas.
16. The device of claim 1 wherein the fluid is gas.

References Cited in the file of this patent

UNITED STATES PATENTS

| | | |
|---|---|---|
| 473,367 | Short | Apr. 19, 1892 |
| 1,122,167 | Southgate | Dec. 22, 1914 |
| 1,906,715 | Penick | May 2, 1933 |
| 2,570,682 | Imbert | Oct. 9, 1951 |
| 2,660,484 | Gerard et al. | Nov. 24, 1953 |
| 2,670,146 | Heizer | Feb. 23, 1954 |
| 2,683,636 | Wilcox | July 13, 1954 |
| 2,760,832 | Bidwell | Aug. 28, 1956 |

FOREIGN PATENTS

| | | |
|---|---|---|
| 129,404 | Sweden | Sept. 12, 1950 |